W. FITTERLING.
AUTOMATIC PHOTOGRAPHIC PRINTER.
APPLICATION FILED FEB. 26, 1907.

910,122.

Patented Jan. 19, 1909.

Inventor
William Fitterling

By Victor J. Evans
Attorney

Witnesses
Geo. Ackman Jr.
C. Bradway

W. FITTERLING.
AUTOMATIC PHOTOGRAPHIC PRINTER.
APPLICATION FILED FEB. 26, 1907.

910,122.

Patented Jan. 19, 1909.

Witnesses
GeoHickman Jr.
C. Bradway.

Inventor
William Fitterling
By Victor J. Evans
Attorney

UNITED STATES PATENT OFFICE.

WILLIAM FITTERLING, OF PALISADES, COLORADO.

AUTOMATIC PHOTOGRAPHIC PRINTER.

No. 910,122.     Specification of Letters Patent.     Patented Jan. 19, 1909.

Application filed February 26, 1907. Serial No. 359,360.

*To all whom it may concern:*

Be it known that I, WILLIAM FITTERLING, a citizen of the United States, residing at Palisades, in the county of Mesa and State of Colorado, have invented new and useful Improvements in Automatic Photograph-Printers, of which the following is a specification.

This invention relates to a photo printing apparatus of that type in which artificial light is employed to make the prints, and relates more particularly to an apparatus in which the exposure for each print is automatically timed.

The invention has for one of its objects to improve and simplify the construction and operation of devices of this character so as to be comparatively easy and inexpensive to manufacture and use, highly reliable and efficient in operation, and easy to manipulate for making exposures of any duration.

A further object of the invention is the employment of an automatically actuated shutter for cutting off the rays of light from the negative when the limit of the exposure is reached, thereby preventing over exposure and consequent loss and waste of prints.

Another object of the invention is to provide a motor for driving an indicator-carriage that controls the closing of the shutter, the carriage being adapted to actuate a brake device to arrest the motor after the shutter has been closed and the exposure completed.

A still further object is to provide a novel form of driving mechanism between the motor and carriage, whereby the latter can be easily and conveniently adjusted to effect an exposure of any desired duration.

An additional object of the invention is to provide a depressible guide rail or track on which the carriage moves while an exposure takes place so that the weight of the carriage causes the track to hold the shutter open, the track being of such length that the carriage passes off of the same at the end of the exposure to permit the track to rise and close the shutter.

A further object is the employment of a novel form of supporting structure or casing which includes a light chamber for holding an incandescent lamp or equivalent means and which is equipped with an adjustable rest for holding the printing frame in operative relation to the light.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention.

Similar reference characters are employed to designate similar parts throughout the several figures.

Figure 2:
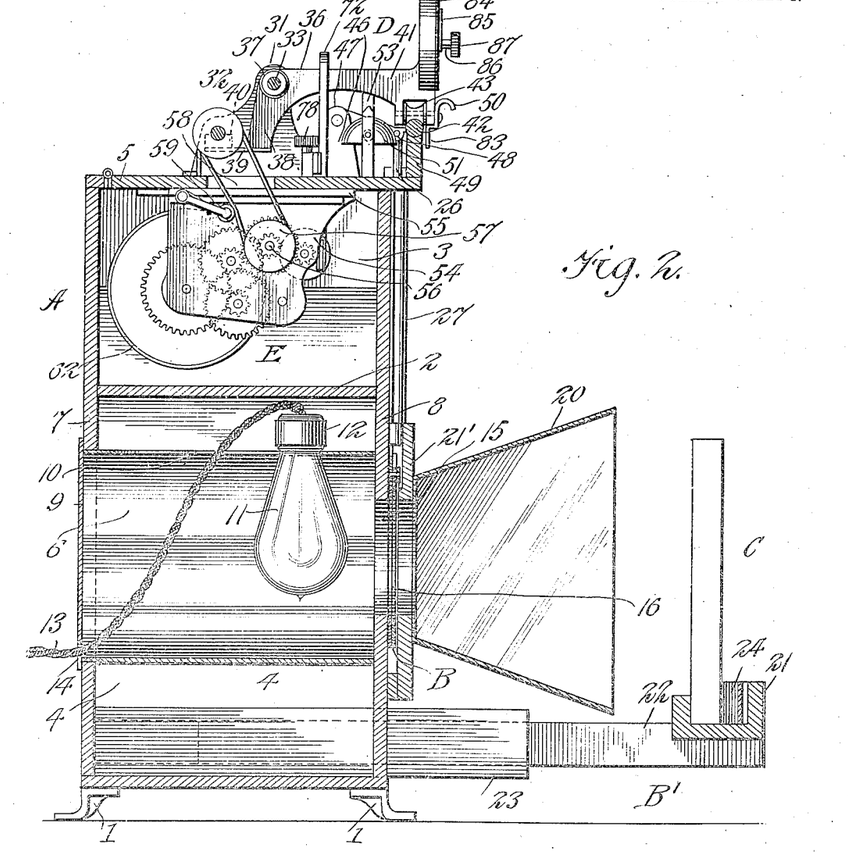
Fig. 2 is a vertical section of the apparatus.
Figure 3:
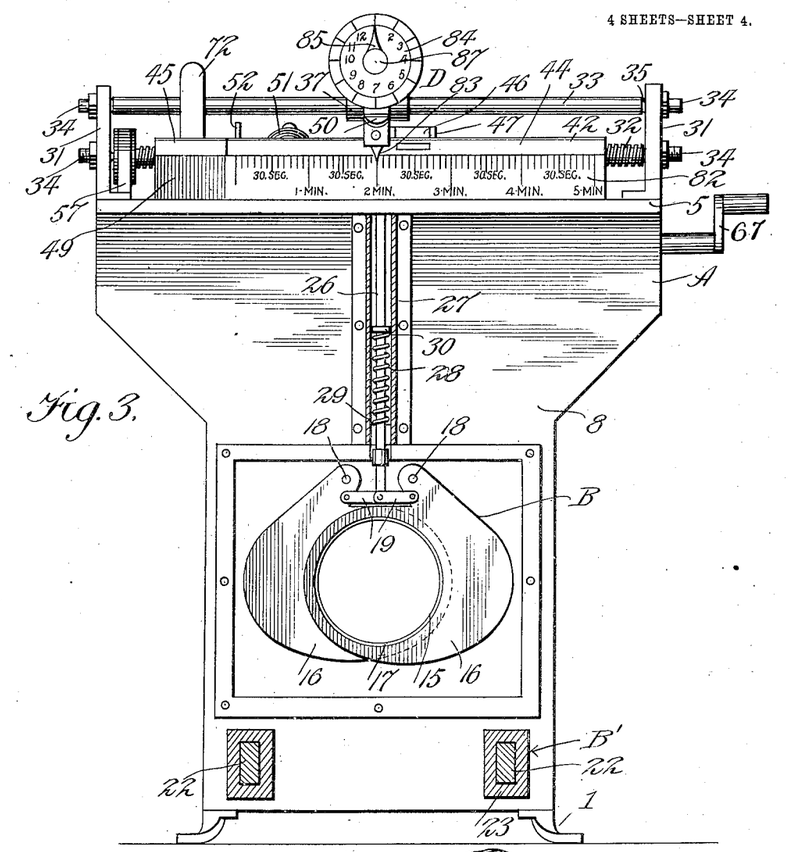
Fig. 3 is a front view with the hood removed and the printing frame rest in section.

Referring to the drawings, A designates a casing or frame of the machine which is preferably of rectangular structure provided with feet 1. The casing is divided by a horizontal partition 2, Fig. 2, into a motor compartment 3 and a light containing compartment 4. The compartment 3 is arranged at the top and is provided with a hinged cover 5 by means of which access to the motor compartment is had. As shown in Fig. 3, the upper portion of the casing is enlarged horizontally. In the compartment 4 is arranged a sheet metal cylindrical shield 6 extending through the rear wall 7 of the casing and bearing against the inside of the front wall 8. The rear end of the shield 6 is closed by a hinged door 9. At the top of the shield is a longitudinal slot 10 in which is held an incandescent lamp 11, the slot having an enlargement at one end for receiving the socket 12 of the lamp by an upward movement therethrough, whereby the lamp can be moved into the narrow portion of the slot and held from dropping by the socket. A flexible cord conducting circuit 13 connects with the lamp and passes out of the casing through an opening 14 in the door 9, as shown in Fig. 2. The front wall 8 is provided with an opening 15 through which the rays of light pass to the printing frame. At the front of this opening is a shutter B for opening and closing the same. This shutter comprises two overlapping sheet metal members 16 having apertures 17 that are adapted to register when the shutter is fully open. These members are fulcrumed at 18 on the front wall of the casing and a pair of toggle links 19, Fig. 3, are employed for actuating the members. Arranged over the shutter is an outwardly flaring sheet metal hood or concentrator 20 for directing the rays of light upon the printing frame. This hood is mounted on a rectangular frame or baseplate 21' that is removably secured on the front wall 8 of the casing.

Figure 1:
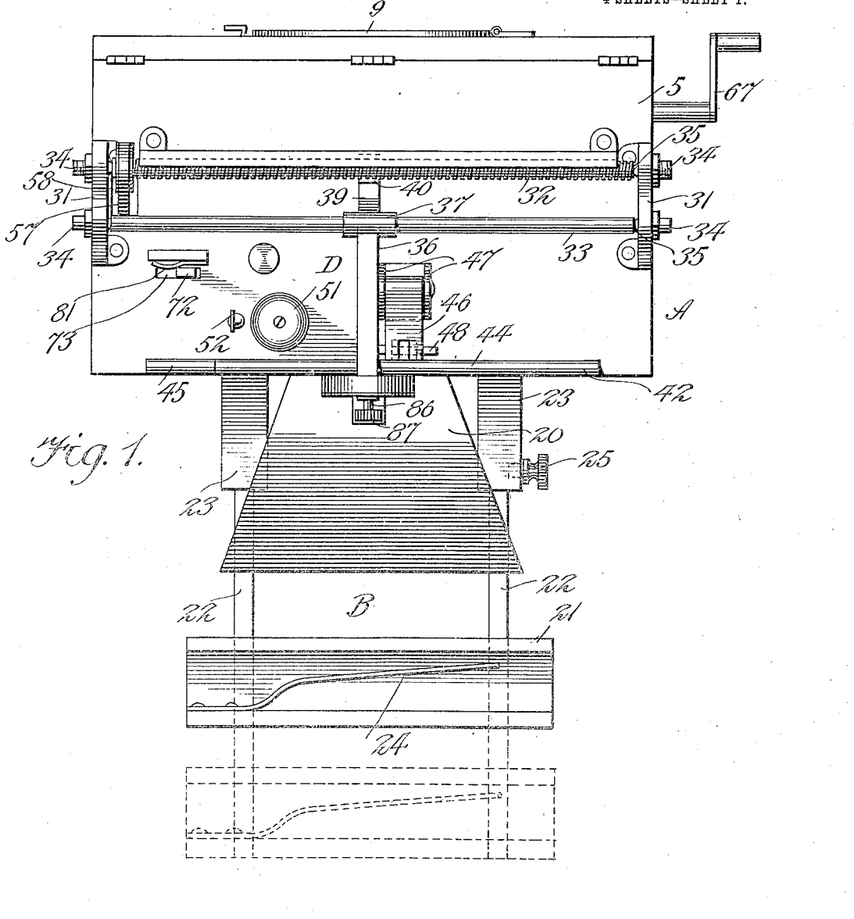
Figure 1 is a plan view of the apparatus.

Arranged below the hood 20 and supported on the casing A is a rest designated generally by B' on which the printing frame C is supported. The rest B' comprises a holder 21 of U-shaped cross-section which is secured to the outer ends of two parallel slides 22 that move back and forth in tubular horizontal guides 23. These guides are arranged in the casing A at the bottom corners thereof and extend forwardly a suitable distance out of the casing. The slides 22 permit of the holder 21 to be adjusted back and forth with respect to the hood 20 so as to accommodate different sized printing frames. In the holder 21 is a leaf spring 24 anchored at one end and arranged to yieldingly hold the printing frame in position and in coöperative relation with the hood 20. To clamp the printing frame rest B' in fixed position, one of the guides 23, shown in Fig. 1, is provided with a clamping screw 25 which binds on the slide 22 extending into the said guide. The holder 21 is open at both ends so that the printing frame C can be inserted or removed by sliding it into the holder from the left hand end, Fig. 1. The bottom edge of the printing frame is engaged by the holder and in inserting the printing frame, the spring 24 is pressed aside and firmly clamps the frame when the latter is in operative position.

The toggle links 19 for actuating the shutter B are connected with a vertically movable rod or actuator 26, Fig. 3, arranged at the front of the casing 1 and inclosed in a housing 27. On the rod 26 is a helical compression spring 28 that bears at its lower end on an abutment 29 in the housing and at its upper end on an abutment 30 formed on the rod. This spring is arranged to collapse the toggle 19 by forcing the rod 26 upwardly and thereby closing the members 16 of the shutter. By pressing down on the rod 26 the toggle 19 is straightened and the members 16 thrown outwardly to cause their openings 17 to register.

Figure 7:
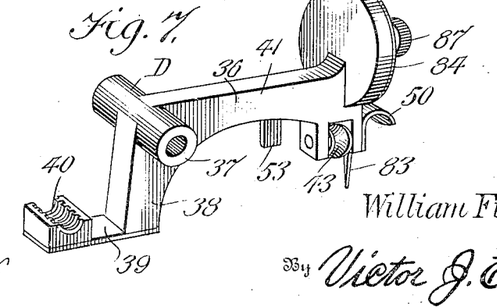
Fig. 7 is a perspective view of the carriage for holding the shutter open.
Figure 8:
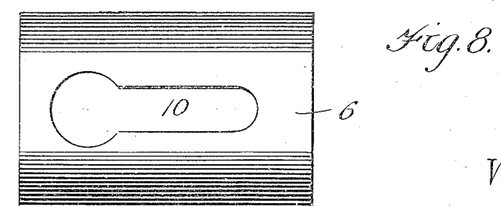
Fig. 8 is a plan view of the shield or cylinder for the lamp of the device.

The operating mechanism for controlling the opening and closing of the shutter through the medium of the rod 26 is mounted on the lid or cover 5 of the casing. On the ends of the cover 5 are bearing brackets 31 on which are supported a threaded shaft 32 and a guide rod 33 arranged in front of and suitably spaced from the threaded shaft. The shaft and guide rod are each journaled on adjustable bearing screws 34 that have conical ends 35 engaging in correspondingly shaped depressions in the ends of the shaft and rod. Slidably supported on the rod 33 is a carriage designated generally by D. This is in the nature of a lever or body 36 slidably fulcrumed on the rod 33 that projects through a bossed hub 37. The front arm of the lever 36 is considerably longer or heavier than the rear arm, so that the weight of the former serves to hold a threaded block on the rear arm in engagement with the threaded shaft 32. As clearly shown in Fig. 7, the short arm 38 of the carriage D carries a spring plate 39 on which is mounted the threaded block 40. This block is approximately half a nut which is arranged to engage the under side of the threaded shaft 32. By this arrangement, the long arm 41 of the carriage can be raised so as to disengage the thread of the block 40 from the shaft to permit the carriage to be freely moved on the guide rod 33 for quickly adjusting the carriage to any desired position. While the carriage is in normal position, the rotation of the shaft causes the carriage to gradually move along the guide rod 33. At the front edge of the cover 5 is a guide rail or way 42 on which the front end of the carriage D movably rests. The carriage is provided with a roller 43, as shown in Fig. 2, which bears on the guide rail to reduce the friction between the parts. The guide rail 42 is divided into a relatively long section 44 that is depressible and a fixed section or rest 45 at the left end, as shown in Fig. 1. The weight of the forward part of the carriage D holds the section 44 of the guide rail depressed and as long as the said section is depressed, the shutter B is open. When the carriage moves off the section 44 to the section 45, the former immediately rises and permits the shutter to close. The movable part of the guide rail 42 is attached to an arm 46, Fig. 1, that is hinged at its rear end in bearing posts 47. The toggle actuating rod 26 passes upwardly through an opening in the cover 5 and is hingedly connected at its top end with the arm 46. A removable pin 48 or equivalent means is employed to connect the rod and arm together, and by removing this pin, the cover 5 can be swung open or closed. The guide rail 42 is supported on a rest 49 in the form of a strip secured on the cover 5 at its front edge. The section 45 is fixedly mounted on the rest or support 49, while, of course, the section 44 of the guide rail bears on the rest only while the carriage D is in running position. To facilitate the adjusting of the carriage, a hook shaped finger hold 50 is arranged on its front end, whereby the carriage can be raised by the first finger gripping under the finger hold and while thus held in raised position, the carriage can be moved laterally on the rod 33. Disposed in the path of the carriage is a suitable signal which is actuated when the carriage reaches the limit of its return stroke for indicating that the exposure is completed and the shutter closed. This signal is a gong 51 on the cover 5, the hammer 52 of which is arranged to be engaged by a projection 53 depending from the carriage, as shown in Fig. 2, so as to spring the hammer laterally as the carriage nears the end of its stroke. As the projection passes off the hammer, the latter flies back and strikes the gong 51, thus warning the photographer that the exposure is finished.

The operating shaft 32 is driven by a motor of any suitable character preferably arranged in the compartment 3 of the casing and supported on the under side of the cover 5. In the present instance, this motor designated generally by E is of the clock-work type. The various parts of the motor are mounted on depending brackets 54 secured to a top plate 55 attached to the cover 5. The motor E drives a shaft 56, Fig. 4, that is connected by a belt and pulley transmission 57 with the threaded carriage-actuating shaft 32. The belt of this transmission passes through a slot 58 in the cover 5. As shown in Fig. 2, a spring-pressed idler pulley 59 holds the belt from the transmission 57 in operative relation to the pulleys. The main shaft or arbor 60 of the motor is driven by a coiled spring 61 in the drum 62 and power is transmitted from the said shaft to the pulley shaft 56 by a suitable train of gears. The motor spring 61 is wound by a pawl and ratchet device 63, the ratchet wheel of which is connected with the drum 62 for turning the same. The ratchet wheel and drum are actuated from outside the casing A by a shaft 64 having a pinion 65 meshing with the gear wheel 66 which latter is associated with the wheel of the ratchet device. The outer end of the shaft 64 has a crank 67 whereby the shaft can be conveniently rotated.

Figures 4, 5, 6:
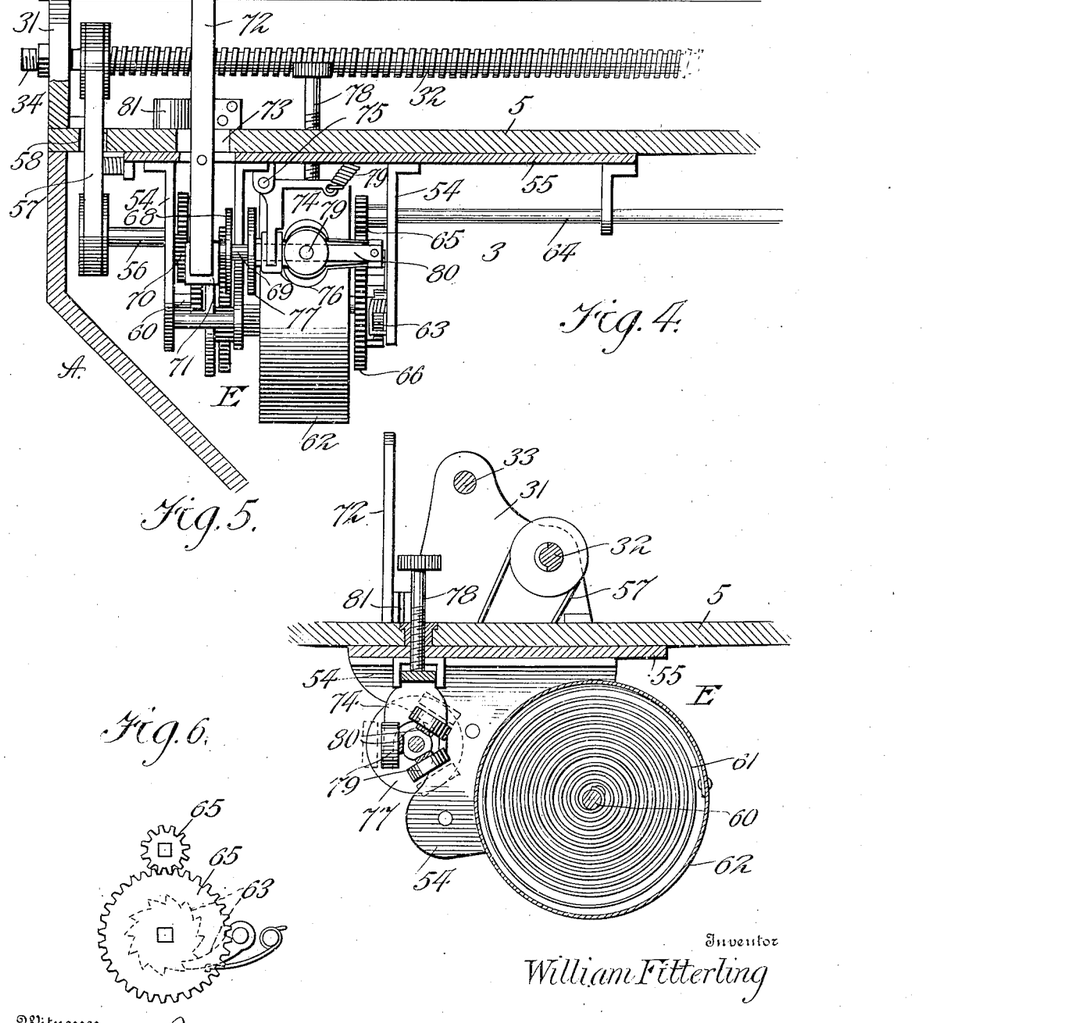
Fig. 4 is a vertical sectional view.
Fig. 5 is a transverse section of the motor.
Fig. 6 is a detail view of a winding means for the motor.

In order to stop the motor when the carriage D reaches the end of its stroke, a brake device is employed that comprises a disk 68 fixed on a shaft 69 geared by means of a pinion 70, Fig. 4, with one of the gear wheels of the train of the motor. Arranged in cooperative relation with this disk is a shoe 71 supported on the lower end of a lever 72 that projects upwardly through an opening 73 in the cover 5. The upper end of this lever is disposed in the path of the carriage D for the purpose of being actuated by the latter when the carriage has passed off the depressible section of the guide rail 42, thus causing the shoe 71 to engage the brake disk 68 and prevent the motor from unwinding when the shutter of the apparatus is closed. To start the motor, all that is necessary is to swing the upper end of the lever or stop 72 to the right, after carriage D has been adjusted to the desired position. To regulate the speed of the motor, a retarding device is employed for loading the motor. This device comprises a bell crank lever 74 fulcrumed at 75, Fig. 4, and carrying a shoe 76 adapted to be held in frictional contact with a disk 77 on the brake shaft 69. The frictional engagement of the shoe with the disk is controlled by an adjusting screw 78 extending downwardly through the cover 5 and bearing against the horizontally extending arm of the bell crank lever. A helical extension spring 79 is connected with the bell crank lever to move the shoe 76 away from the disk 77 when the adjusting screw 78 is moved outwardly. On the shaft 69 is a speed governor having centrifugally acting weights 79 arranged on arms 80. These arms are connected with the shaft 69 to rotate therewith and they are also connected with the friction disk 77 for pulling the latter into firmer engagement with the shoe 76. The governor thus increases the load on the motor so that the speed is prevented from exceeding a predetermined limit.

The brake lever 72 is held in set position by a leaf spring 81 disposed at the rear thereof to have a wiping engagement with the lever. As shown in Figs. 1 and 2, the lever 72 is in normal position as when the motor is in operation. By moving the lever to the left for setting the brake, the spring 81 frictionally holds the lever in fixed position, so that the brake cannot open except by manually shifting the lever to the right.

On the front side of the rest or support 49 for the guide rail 42, is a scale 82 having suitable divisions and denominations such as minutes and seconds. In the present instance, the scale is suitable for a maximum exposure of five minutes. On the front end of the carriage D is a pointer or index 83 which is conveniently formed as a part of the finger hold 50. This pointer or index is disposed to pass over the top edge of the scale when the carriage D is in normal position. In Fig. 3, the pointer is arranged opposite the two-minute mark of the scale. While the carriage is resting on the depressible portion of the rail 42, the shutter B is open and by the time the motor has caused the carriage to ride off the depressible portion of the rail a two-minute exposure has been made. Thus it will be seen that by starting the carriage at any point along the scale 82, an accurately timed exposure of any desired length can be obtained.

To indicate the number of exposures, the carriage D is provided with a dial 84 at its front, with which is associated a hand 85 on a finger-actuated shaft 86. This shaft has a milled head 87 whereby it can be conveniently turned. Each time an exposure is taken, the hand 85 is turned one step thus enabling the photographer to keep an accurate count of the prints that have been made.

From the foregoing description taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired as are within the scope of the claims.

Having thus described the invention, what I claim is:—

1. In an apparatus of the class described, the combination of a shutter device including a controlling member, means tending to hold the device in closed position, a motor driven element arranged to travel on the member and operating by its weight to hold the device open and adapted to move off the member to permit the device to close, and means for permitting the element to be quickly moved by hand to set position.

2. In an apparatus of the class described the combination of a casing and source of light therein, a printing frame holder, a shutter between the source of light and holder, an automatically actuated means for holding the shutter open during an exposure and for closing the same at the end of an exposure, said means including a movably mounted shutter operating member, a horizontally movable carriage arranged to move on the member to hold the shutter open during an exposure and movable off the member to permit the shutter to close after an exposure, means for adjusting the carriage for exposures of different lengths, and a motor for positively driving the carriage.

3. In an apparatus of the class described, the combination of a casing, a source of light therein, a printing frame holder, a shutter mounted on the casing to cut off the rays of light, with a mechanism mounted on the casing for automatically actuating the shutter, said mechanism comprising a carriage arranged to hold the shutter open for exposures of different lengths and so constructed that its weight holds the shutter open during an exposure, a movably mounted shutter-operating member on which the carriage bears to hold the shutter open and off which the carriage finally moves to terminate the exposure, a motor for driving the carriage, and a brake device actuated by the carriage at the end of an exposure for stopping the motor.

4. In an apparatus of the class described, the combination of a pair of swinging shutter members, toggle links connected therewith, a longitudinally movable rod connected with the joint of the links, a spring operating on the rod to throw the shutter members to closed position, a motor driven element traveling in a path at right angles to the rod and operating by its weight to depress the rod and throw the shutter members to open position, a depressible rail on which the carriage moves and adapted to be held depressed by the carriage until the latter moves off the same, and an operative connection between the rail and rod.

5. In an apparatus of the class described the combination of a pair of swinging shutter members, toggle links connected with the members, a longitudinally movable rod connected with the joint of the links, a spring operating on the rod to throw the shutter members to closed position, and a depressible track carried by and movable with the rod to open the shutter members when the track is depressed, a motor driven element movable on and off the track for holding the latter depressed during an exposure and permitting the track to move upwardly for closing the shutter members when the element moves off the track.

6. In an apparatus of the class described, the combination of a shutter, a vertically extending rod, a spring thereon tending to move the shutter to closed position, a track secured to the rod and extending from opposite sides thereof in a horizontal direction, a horizontally movable carriage, and means for supporting the carriage and on which the latter travels only during an exposure to cause the weight of the carriage when sustained on the track to throw and hold the shutter open against the tension of the said spring.

7. The combination of a shutter device pivoted in such a manner as to tend to close by gravity, a carriage arranged to hold the shutter device open for exposures of different lengths, a member held depressed by the weight of the carriage and on which the latter travels for a time for holding the shutter open and from which the carriage passes to permit the shutter to close, and a spring coöperating with the weight of the shutter for moving the latter to closed position when the weight of the carriage is removed from said member.

8. The combination of a pair of shutters, independent pivots on which the shutters are suspended, toggle links connected with the shutters, a carriage adapted to hold the shutter open for exposures of different lengths, means for actuating the carriage, a device responsive to the weight of the carriage and operating through the toggle links to hold the shutters open, said carriage being arranged to travel for a time on the device during an exposure and finally leave the same to permit the shutter to close and means for collapsing the toggle links when the weight of the carriage is removed from the device to permit the shutters to move to closed position.

9. In an apparatus of the class described, the combination of a shutter device, a carriage controlling the same for exposures of different lengths, a spring motor, an operating screw between the same and carriage for driving the latter, a brake device set automatically by the carriage after the completion of an exposure, and a manually-actuated brake device arranged to prevent unwinding of the motor.

10. In an apparatus of the class described, the combination of a casing, a source of light therein, a shutter for cutting off the rays of light, said shutter comprising a pair of members having openings adapted to register, separate pivots for the members, a toggle connected with the members, a rod connected with the toggle, a spring on the rod tending to hold the toggle collapsed and the shutter members in closed position, a carriage set to starting position by hand and operating to act through the rod and toggle to hold the shutter members open, a motor, an operating screw connected with the motor for driving the carriage, and means for stopping the motor automatically by the action of the carriage.

11. In an apparatus of the class described, the combination of a casing having an opening, a source of light arranged in the casing to emit rays through the opening, a shutter closing the opening and composed of simultaneously actuated members, toggle links connected with the members and arranged to hold the latter open when the links are straightened, a spring arranged to collapse the toggle links to hold the members closed, a motor driven carriage adapted during a portion of its movement to hold the toggle links straightened under the weight of the carriage, and means for receiving the weight of the carriage during the remaining portion of its movement to permit the spring to quickly collapse the toggle links.

12. In an apparatus of the class described, the combination of a shutter composed of overlapping members having openings adapted to register, fulcrums on which the members move, toggle links connected with the members arranged when straightened to hold the latter with their openings in register, and a spring-actuated member connected with the toggle links for collapsing the latter, and a weighted carriage mounted to operate on the member to hold the shutters in one position.

13. In an apparatus of the class described, the combination of a shutter, a carriage, a screw mechanism for moving the carriage, means for moving the screw in only one direction, means connected with the screw for permitting the carriage to be moved in one direction by hand, and means between the carriage and shutter for opening and closing the latter.

14. In an apparatus of the class described, the combination of a shutter, a carriage, a motor for driving the carriage, means for stopping the motor by action of the carriage, means actuated approximately simultaneously with the stopping of the carriage for automatically closing the shutter, and a manually set friction brake for the motor.

15. In an apparatus of the class described, the combination of a shutter, a carriage, a member depressed by the weight of the carriage, means for actuating the carriage to pass off the member to permit the latter to rise and means between the member and shutter for opening the latter when the carriage bears on the member and for closing the shutter when the carriage passes off the member.

16. In an apparatus of the class described, the combination of a shutter, a carriage, a depressible member on and off which the carriage moves, and a spring-actuated rod between the member and shutter for closing the latter when the carriage moves off the member.

17. In an apparatus of the class described, the combination of a shutter, a carriage, a device on which the carriage moves, said device comprising a fixed and a movable section, means between the movable section and the shutter for holding the latter open as long as the carriage bears on the section, and means for closing the shutter as the carriage passes off the movable to the fixed section.

18. In an apparatus of the class described, the combination of a shutter, a carriage, a device on which the carriage moves, said device comprising a fixed and a movable section, means between the movable section and the shutter for holding the latter open as long as the carriage bears on the section, means for closing the shutter as the carriage passes off the movable to the fixed section, and a signal actuated by the carriage at the closing of the shutter.

19. In an apparatus of the class described, the combination of a shutter, a carriage, a guide rail on which the carriage moves, said rail being composed of a fixed section and a yieldingly mounted section adapted to move under the weight of the carriage, a spring-actuated rod connected with the shutter and yieldable section of the guide rail, and a motor for actuating the carriage and which is automatically stopped by the latter.

20. In an apparatus of the class described, the combination of a shutter, adjustable means for holding the shutter open for any desired period of exposure, a motor for actuating said means, a device for stopping the motor simultaneously with the closing of the shutter, and a signal means actuated with the closing of the shutter.

21. In an apparatus of the class described, the combination of a shutter, a carriage for controlling the same, supporting means on which the carriage moves and connected with the shutter for actuating the latter, a screw for driving the carriage, a threaded member held in engagement with the screw by the carriage, and a motor for actuating the screw.

22. In an apparatus of the class described, the combination of a carriage, a shutter controlled thereby, a rod on which the carriage is fulcrumed and moves bodily, a screw for driving the carriage, a threaded member held in engagement with the screw and adapted to be released therefrom by a swinging movement of the carriage, and a motor controlled by the carriage for actuating the screw.

23. In an apparatus of the class described, the combination of a carriage, means on which the carriage is mounted for a swinging and a lateral movement, a scale arranged along the path of the carriage in its lateral movement, an index on the carriage arranged in coöperative relation with the scale, an operating screw, and a threaded member attached to the carriage and arranged to engage or disengage the screw by a swinging movement of the carriage, with a shutter mechanism controlled by the carriage.

24. In an apparatus of the class described, the combination of a carriage, a guide rod extending through the carriage, a carriage operating screw disposed parallel with the rod, a threaded block, a spring for holding the block on the carriage, a scale arranged in the path of the carriage, an index on the carriage, and a motor for actuating the screw, and a shutter mechanism controlled by the carriage.

25. In an apparatus of the class described, the combination of a carriage in the nature of a lever having one arm heavier than the other, a guide rod on which the carriage moves and which is movable under the weight of the heavier arm, a carriage operating screw, a threaded member attached to the carriage and releasably held in engagement with the screw by the weight of the heavier arm, said carriage being freely slidable along the guide rod while the threaded member is held out of engagement with the screw, means for actuating the screw, and a shutter device controllable by the movement of the guide rod.

26. In an apparatus of the class described, the combination of a carriage, a guide rod on which the carriage can tilt, means for moving the carriage longitudinally of the rod, and means for disconnecting the carriage from the said means by imparting a tilting movement to the carriage, a shutter, and means between the shutter and carriage for controlling the former by the weight of the latter.

27. In an apparatus of the class described, the combination of a shutter, a carriage, means controlled by the carriage for actuating the shutter, a guide member on which the carriage moves and is adapted to tilt, a carriage operating screw, means for connecting and disconnecting the carriage with the screw by a tilting movement of the former, a scale disposed along the path of the carriage, and an index on the carriage.

28. In an apparatus of the class described, the combination of a carriage, a scale arranged along the path of the carriage, an index on the carriage, a motor for actuating the carriage, and a brake device actuated by the carriage for stopping the motor, with a shutter mechanism controlled by the carriage.

29. In an apparatus of the class described, the combination of a carriage, a shutter controlled by the carriage, an indicating means for setting the carriage to actuate the shutter at a given time, a motor for moving the carriage, a brake device for stopping the motor automatically by the carriage, and means for holding the brake device set.

30. In an apparatus of the class described, the combination of a carriage, a shutter controlled by the carriage, an indicating means for setting the carriage to actuate the shutter at a given time, a motor for driving the carriage, a brake device actuated by the carriage for stopping the motor, and an adjustable regulator for the motor.

31. In an apparatus of the class described, the combination of a carriage, a shutter controlled thereby, an indicating means to set the carriage to operate the shutter at a given time, a motor for driving the carriage, an automatic brake for the carriage motor, a speed regulating means, and means for energizing the motor.

32. In an apparatus of the class described, the combination of a carriage, a shutter controlled thereby, an indicating means to set the carriage to operate the shutter at a given time, a dial on the carriage for indicating the number of exposures, and a hand operated index coöperating with the dial.

33. In an apparatus of the class described, the combination of a casing, a source of light therein, a shutter controlling the emission of light from the casing, a mechanism for opening and closing the shutter, a movable cover for the casing on which said mechanism is mounted, a motor on the cover for driving the said mechanism.

In testimony whereof, I affix my signature in presence of two witnesses.

WILLIAM FITTERLING.

Witnesses:
J. B. WEBER,
JAMES McCULLY.